Patented Apr. 16, 1940

2,197,624

UNITED STATES PATENT OFFICE 2,197,624

INSECTICIDE AND INSECT REPELLENT

William P. ter Horst, Packanack Lake, and Robert W. Eldridge, Nutley, N. J., assignors to United States Rubber Company, New York, N. Y., a corporation of New Jersey No Drawing. Application February 1, 1939, Serial No. 254,049

4 Claims. (Cl. 167—22)

This invention relates to improvements in insecticides and insect repellents.

It has been found that materials having the formula

where $n$ is 2 or 3, and X is hydrogen or metal, are useful as insecticides and insect repellents, and accordingly the invention relates to preparations containing such compounds as active constituents when prepared for and used for such purposes.

A preferred example is the compound

(formamidine sulfinic acid). It may be prepared by oxidation of thiourea (J. Boeseken; Proc. Acad. Soc. Amsterdam 41 (1938). When this material was dusted on fresh Irish potato leaves (at the rate of 96 lbs. per acre) containing Colorado-potato-beetle-larvae, the larvae stopped feeding after 8 hours and were all dead after 24 hours. Only 1% of the foliage had been eaten.

Further tests with the same chemical are also given as follows:

Mexican bean beetle larvae were used as the test animals and snap-bean foliage was used as the host and the chemical was applied at the rate of 38 lbs. per acre. At the end of 24 hours, 40% of the larvae were dead, and at the end of 48 hours all larvae were dead, and only .1% of the foliage had been eaten.

A similar test made with the cotton leafworm as the test animal and cotton leaves as the host resulted in 100% mortality at the end of 72 hours, and only .1% of the foliage had been eaten.

In an additional test the chemical in the form of dust was applied to bean leaves containing Mexican bean beetle larvae at the rate of .16 milligram per square millimeter. At the end of 72 hours 90% mortality had occurred, with only .2% of the foliage consumed.

The chemical has also been found to act as a moth repellent when tests were made using carpet beetle larvae as the test animals.

Where the hydrogen in the above formulae is replaced by metal, to form metal salts, any metal such as ammonium, sodium, potassium, calcium, magnesium, zinc, iron, copper, lead, mercury, etc. may be used.

The chemicals may be used in the forms conventional to the art, with or without various assistants, e. g. dusts, solutions, suspensions, etc.

Having thus described our invention, what we claim and desire to protect by Letters Patent is:

1. As an insecticide or insect repellent, a preparation containing as an active ingredient, a compound having the formula

where $n$ is 2 or 3, and X is hydrogen or metal.

2. As an insecticide or insect repellent, a preparation containing as an active ingredient, a compound having the formula

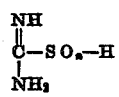

where $n$ is 2 or 3.

3. As an insecticide or insect repellent, a preparation containing as an active ingredient, a sulfino-formamidine compound selected from the group consisting of formamidine sulfinic acid and the metal salts thereof.

4. As an insecticide or insect repellent, a preparation containing as an active ingredient, formamadine sulfinic acid.

WILLIAM P. TER HORST.
ROBERT W. ELDRIDGE.